US008814146B2

(12) United States Patent
McDermott et al.

(10) Patent No.: US 8,814,146 B2
(45) Date of Patent: *Aug. 26, 2014

(54) TWO PHASE REACTOR

(71) Applicant: Neumann Systems Group, Inc., Colorado Springs, CO (US)

(72) Inventors: William Edward McDermott, Littleton, CO (US); David Kurt Neumann, Colorado Springs, CO (US); Thomas Lee Henshaw, Monument, CO (US)

(73) Assignee: Neumann Systems Group, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,818

(22) Filed: Oct. 24, 2012

(65) Prior Publication Data

US 2013/0175715 A1   Jul. 11, 2013

Related U.S. Application Data

(63) Continuation of application No. 12/956,876, filed on Nov. 30, 2010, now Pat. No. 8,323,381, which is a continuation of application No. 12/012,568, filed on Feb. 4, 2008, now Pat. No. 7,871,063, which is a continuation of application No. 11/057,539, filed on Feb. 14, 2005, now Pat. No. 7,379,487.

(51) Int. Cl.
  *B01D 47/00* (2006.01)
(52) U.S. Cl.
  USPC .......................... 261/23.1; 261/115
(58) Field of Classification Search
  None
  See application file for complete search history.

(56) References Cited

U.S. PATENT DOCUMENTS

| | | | |
|---|---|---|---|
| 441,106 A | 11/1890 | Monsanto |
| 2,484,277 A | 10/1949 | Fisher |
| 2,604,185 A | 7/1952 | Johnstone et al. |
| 2,631,019 A | 3/1953 | Yates |
| 2,687,614 A | 8/1954 | Goddard |
| 3,215,415 A | 11/1965 | Stephens et al. |
| 3,237,381 A | 3/1966 | Hvostoff et al. |
| 3,465,504 A | 9/1969 | Oropeza et al. |
| 3,488,924 A | 1/1970 | Reeve |
| 3,524,630 A | 8/1970 | Marion |
| 3,533,560 A | 10/1970 | Meek |
| 3,582,050 A | 6/1971 | Kozak |
| 3,607,624 A | 9/1971 | Moody et al. |

(Continued)

FOREIGN PATENT DOCUMENTS

| | | |
|---|---|---|
| CN | 1642628 | 7/2005 |
| GB | 2059286 | 4/1981 |

(Continued)

OTHER PUBLICATIONS

U.S. Appl. No. 13/672,697, filed Nov. 8, 2012, Neumann et al.

(Continued)

*Primary Examiner* — Duane Smith
*Assistant Examiner* — Pankti Patel
(74) *Attorney, Agent, or Firm* — Aspire IP; Scott J. Hawranek

(57) ABSTRACT

A two phase reactor includes a source of liquid reactant and a source of gas reactant. A chamber has an inlet coupled to the source of gas reactant and a flat jet nozzle coupled to the source of the liquid reactant.

20 Claims, 5 Drawing Sheets

(56) References Cited

U.S. PATENT DOCUMENTS

| | | |
|---|---|---|
| 3,731,461 A | 5/1973 | Hamon |
| 3,766,489 A | 10/1973 | Rosenberg et al. |
| 3,840,304 A | 10/1974 | Hirafuji |
| 3,847,714 A | 11/1974 | Davies et al. |
| 3,914,348 A | 10/1975 | Kors et al. |
| 3,934,012 A | 1/1976 | Schievelbein |
| 3,948,608 A | 4/1976 | Weir, Jr. |
| 3,984,786 A | 10/1976 | Pike |
| 3,985,860 A | 10/1976 | Mandelik |
| 4,011,287 A | 3/1977 | Marley |
| 4,026,682 A | 5/1977 | Pausch |
| 4,073,832 A | 2/1978 | McGann |
| 4,083,932 A | 4/1978 | Muraco et al. |
| 4,099,140 A | 7/1978 | Snelling et al. |
| 4,102,982 A | 7/1978 | Weir, Jr. |
| 4,128,206 A | 12/1978 | Bintner |
| 4,246,245 A | 1/1981 | Abrams et al. |
| 4,261,511 A | 4/1981 | Erb et al. |
| 4,269,812 A | 5/1981 | Edwards et al. |
| 4,284,590 A | 8/1981 | DeBoer et al. |
| 4,310,476 A | 1/1982 | Nahra et al. |
| 4,314,670 A | 2/1982 | Walsh |
| 4,326,553 A | 4/1982 | Hall |
| 4,340,572 A | 7/1982 | Ben-Shmuel et al. |
| 4,343,771 A | 8/1982 | Edwards et al. |
| 4,348,432 A | 9/1982 | Huang |
| 4,363,786 A | 12/1982 | Adams et al. |
| 4,378,236 A | 3/1983 | Helms |
| 4,403,324 A | 9/1983 | Woste |
| 4,419,301 A | 12/1983 | Nahra et al. |
| 4,507,969 A | 4/1985 | Djordjevic et al. |
| 4,633,623 A | 1/1987 | Spitz |
| 4,641,785 A | 2/1987 | Grothe |
| 4,668,498 A | 5/1987 | Davis |
| 4,720,290 A | 1/1988 | McCoy |
| 4,740,308 A | 4/1988 | Fremont et al. |
| 4,744,518 A | 5/1988 | Toth |
| 4,810,268 A | 3/1989 | Chambers et al. |
| 4,819,878 A | 4/1989 | Bailey et al. |
| 4,828,768 A | 5/1989 | Talmor |
| 4,834,288 A | 5/1989 | Kenney et al. |
| 4,887,100 A | 12/1989 | Michaelis et al. |
| 4,893,754 A | 1/1990 | Ruiz |
| 4,913,225 A | 4/1990 | Chubb |
| 4,915,914 A | 4/1990 | Morrison |
| 4,948,402 A | 8/1990 | Davis |
| 4,968,328 A | 11/1990 | Duke |
| 4,989,788 A | 2/1991 | Bendig et al. |
| 5,057,853 A | 10/1991 | Fisher |
| 1,538,457 A | 3/1992 | Zoelly |
| 5,170,727 A | 12/1992 | Nielsen |
| 5,202,103 A | 4/1993 | Chang et al. |
| 5,269,967 A | 12/1993 | Achgill |
| 5,330,563 A | 7/1994 | Yamase et al. |
| 5,364,604 A | 11/1994 | Spink et al. |
| 5,392,988 A | 2/1995 | Thayer |
| 5,395,482 A | 3/1995 | Onda et al. |
| 5,419,487 A | 5/1995 | Nielsen et al. |
| 5,464,154 A | 11/1995 | Nielsen |
| 5,474,597 A | 12/1995 | Halldin |
| 5,544,571 A | 8/1996 | Nahra et al. |
| 5,565,180 A | 10/1996 | Spink |
| 5,580,531 A | 12/1996 | Vassiliou et al. |
| 5,615,836 A | 4/1997 | Graef |
| 5,634,413 A | 6/1997 | Listner et al. |
| 5,639,025 A | 6/1997 | Bush |
| 5,643,799 A | 7/1997 | Atwater |
| 5,655,255 A | 8/1997 | Kelly |
| 5,735,465 A | 4/1998 | Laforcade |
| 5,744,110 A | 4/1998 | Mimura et al. |
| 5,802,095 A | 9/1998 | Schall |
| 5,833,148 A | 11/1998 | Steinhilber et al. |
| 5,837,206 A | 11/1998 | Traffenstedt et al. |
| 5,870,422 A | 2/1999 | Florentino et al. |
| 5,893,943 A | 4/1999 | Durham et al. |
| 5,947,390 A | 9/1999 | Smith |
| 5,974,072 A | 10/1999 | Hartlove |
| 6,010,640 A | 1/2000 | Beshore et al. |
| 6,051,055 A | 4/2000 | Ukawa et al. |
| 6,072,820 A | 6/2000 | Dickerson |
| 6,090,186 A | 7/2000 | Spencer |
| 6,228,145 B1 | 5/2001 | Falk-Pedersen et al. |
| 6,309,711 B1 | 10/2001 | Tseng et al. |
| 6,459,717 B1 | 10/2002 | Henshaw |
| 6,550,751 B1 | 4/2003 | Brown et al. |
| 6,612,509 B2 | 9/2003 | Holmstrom |
| 6,652,624 B2 | 11/2003 | Ku et al. |
| 6,656,253 B2 | 12/2003 | Willey et al. |
| 6,714,570 B1 | 3/2004 | Brown |
| 6,760,406 B2 | 7/2004 | Hertz et al. |
| 6,824,071 B1 | 11/2004 | McMichael |
| 6,830,608 B1 | 12/2004 | Peters |
| 6,843,835 B2 | 1/2005 | Fornai et al. |
| 6,918,949 B1 | 7/2005 | Peters |
| 6,938,434 B1 | 9/2005 | Fair |
| 7,021,571 B1 | 4/2006 | Lawson et al. |
| 7,066,398 B2 | 6/2006 | Borland et al. |
| 7,116,696 B2 | 10/2006 | Emanuel |
| 7,163,163 B2 | 1/2007 | Waddelow |
| 7,219,849 B1 | 5/2007 | Hedger |
| 7,285,309 B2 | 10/2007 | Nakamura et al. |
| 7,318,855 B2 | 1/2008 | Newman et al. |
| 7,379,487 B2 | 5/2008 | McDermott et al. |
| 7,618,606 B2 | 11/2009 | Fan et al. |
| 7,866,638 B2 | 1/2011 | Neumann et al. |
| 7,871,063 B2 * | 1/2011 | McDermott et al. .......... 261/153 |
| 8,088,292 B2 | 1/2012 | Neumann et al. |
| 8,105,419 B2 | 1/2012 | Neumann et al. |
| 8,113,491 B2 | 2/2012 | Neumann et al. |
| 8,216,346 B2 | 7/2012 | Neumann et al. |
| 8,216,347 B2 | 7/2012 | Neumann et al. |
| 8,262,777 B2 | 9/2012 | Neumann et al. |
| 8,323,381 B2 | 12/2012 | McDermott et al. |
| 8,336,863 B2 * | 12/2012 | Neumann et al. ............. 261/115 |
| 2002/0061271 A1 | 5/2002 | Zauderer |
| 2003/0080447 A1 | 5/2003 | Ye et al. |
| 2004/0126293 A1 | 7/2004 | Geerlings et al. |
| 2004/0131531 A1 | 7/2004 | Geerlings et al. |
| 2004/0183216 A1 | 9/2004 | Cross |
| 2005/0002847 A1 | 1/2005 | Maroto-Valer et al. |
| 2005/0109861 A1 | 5/2005 | Chen |
| 2005/0156064 A1 | 7/2005 | Tanigaki et al. |
| 2005/0229553 A1 | 10/2005 | TeGrotenhuis et al. |
| 2006/0016728 A1 | 1/2006 | Shorts |
| 2007/0085227 A1 | 4/2007 | Tonkovich et al. |
| 2007/0189949 A1 | 8/2007 | Hsieh et al. |
| 2008/0119356 A1 | 5/2008 | Ryu et al. |
| 2008/0210199 A1 | 9/2008 | Zeng et al. |
| 2010/0089232 A1 | 4/2010 | Neumann et al. |
| 2010/0092368 A1 | 4/2010 | Neumann et al. |

FOREIGN PATENT DOCUMENTS

| | | |
|---|---|---|
| JP | 59-88510 | 5/1984 |
| JP | 11-114354 | 4/1999 |
| JP | 11-116223 | 4/1999 |
| JP | 11-197499 | 7/1999 |
| JP | 2002-136828 | 5/2002 |
| JP | 2006-255629 | 9/2006 |

OTHER PUBLICATIONS

"Carbon Dioxide Storage by Mineral Carbonation," IEA, Report No. 2005/11, Sep. 2005, 41 pages.

"Chilled Ammonia-based Wet Scrubbing for Post-Combustion CO2 Capture," DOE/NETL-401-021507, Feb. 2007, 78 pages.

Ciferno et al., "An Economic Scoping Study for CO2 Capture Using Aqueous Ammonia," DOE/NETL Final Report, 2005, pp. 1-15.

Cullinane, "Thermodynamics and Kinetics of Aqueous Piperazine with Potassium Carbonate for Carbon Dioxide Absorption", pp. 167-171, Dissertation, The University of Texas at Austin, 2005.

Cullinane "Thermodynamics and Kinetics of Aqueous Piperazine with Potassium Carbonate for Carbon Dioxide Absorption," Dissertation, The University of Texas at Austin, May 2005, pp. 209-211.

(56) References Cited

OTHER PUBLICATIONS

Definition of "sheet" as found in the Free Dictionary online. Www.thefreedictionary/sheet (Dec. 16, 2011).
Definition of "planar" as found in the Free Dictionary online. Www.thefreedictionary/planar (Dec. 16, 2011).
Drbal et al. (eds.), Power Plant Engineering by Black & Veatch, Chapman & Hall, 1996, pp. 1-879.
Howells, "Super-Water [R] Jetting Applications From 1974 to 1999", pp. 1-21, 1999.
Huijgen, et al., "Cost Evaluation of C02 sequestration by aqueous mineral carbonation," Energy Conversion and Management, 48, pp. 1923-1935, 2007.
Kodama et al., "Development of a new pH-swing CO2 mineralization process with a recyclable reaction solution," Energy, May 2008, vol. 33, pp. 776-784.
Kohl, et al. Gas Purification, Gulf Professional Publishing, 5 ed., 1997.
Lani et al., "Update on DOE/NETL's Advanced Nox Emissions Control Technology R&D Program," U.S. Department of Energy, National Energy Laboratory, Science Applications International Corporation, Nov. 2006, pp. 1-18.
O'Conner et al., "Aqueous Mineral Carbonation: Mineral Availability, Pretreatment, Reaction Parametrics, and Process Studies," National Energy Technology Laboratory (formerly Albany Research Center), DOE/ARC-TR-04-002, Mar. 2005, 459 pages.
Oyenekan, et al., "Alternative Stripper Configurations for C02 Capture by Aqueous Amines", AIChE Journal, vol. 53, No. 12, pp. 3144-3154, 2007.
Plasynski, et al. Carbon Dioxide Capture by Absorption with Potassium Carbonate, Carbon Sequestration, Project Facts, US DOE, NETL, Apr. 2008, 2 pgs.
Trachtenberg, MC, et al. "Seventh International Conference on Greenhouse Gas Control Technologies (GHGT-7)," Vancouver, BC, 2004, 1751-1754.
Van Holst, J., et al. C02 Capture from Flue Gas Using Amino Acid Salt Solutions, Proceedings of 8th International Conference on Greenhouse Gas Control Technologies, 2006.
Yeh, et al., Semi-batch absorption and regeneration studies for C02 capture by aqueous ammonia, Fuel Processing Technology, vol. 86, Issues 14-15, pp. 1533-1546, Oct. 2005.
International Search Report and Written Opinion of the International Searching Authority for PCT/US2009/049707 mailed Aug. 31, 2009.
International Preliminary Report on Patentability for International (PCT) Patent Application No. PCT/US2009/049707, mailed Nov. 8, 2010.
International Search Report and Written Opinion of the International Searching Authority for PCT/US09/58631 mailed Jul. 28, 2010.
International Search Report and Written Opinion of the International Searching Authority for PCT/US2009/58634 mailed Jan. 13, 2010.
International Preliminary Report on Patentability for International (PCT) Patent Application No. PCT/US2009/58634, mailed Nov. 22, 2010.
International Search Report and Written Opinion of the International Searching Authority for PCT/US2009/58637 mailed Jan. 13, 2010.
International Preliminary Report on Patentability for International (PCT) Patent Application No. PCT/US2009/58637, mailed Feb. 15, 2011.
First Office Action (including translation) for Chinese Patent Application No. 200980145932.2, dated Aug. 14, 2012.
Search Report for European Patent Application No. 09816647.3, dated Feb. 10, 2012 7 pages.
Search Report for European Patent Application No. 09817000.4, dated Feb. 10, 2012 12 pages.
Search Report for European Patent Application No. 09817003.8, dated Feb. 15, 2012 7 pages.
Extended Search Report for European Patent Application No. 09817006.1, dated Mar. 28, 2012 10 pages.
First Office Action (including translation) for Chinese Patent Application No. 200980145235.7, dated Feb. 27, 2013.
First Office Action (including translation) for Chinese Patent Application No. 200980145235.7, dated Jan. 23, 2013.
First Office Action (including translation) for Chinese Patent Application No. 200980145726.1, dated Mar. 5, 2013.

\* cited by examiner

TWO PHASE REACTOR

CROSS REFERENCE TO RELATED APPLICATIONS

This application is a continuation of U.S. patent application Ser. No. 12/956,876, entitled "Two Phase Reactor", filed on Nov. 30, 2010, which is a continuation of U.S. patent application Ser. No. 12/012,568, entitled "Two Phase Reactor," filed on Feb. 4, 2008, now U.S. Pat. No. 7,871,063, which is a continuation of U.S. patent application Ser. No. 11/057,539, entitled "Two Phase Reactor," filed on Feb. 14, 2005, now U.S. Pat. No. 7,379,487; all of which are hereby fully incorporated by reference.

FIELD OF THE INVENTION

The present invention relates generally to the field gas liquid contactors and more particularly to a two phase reactor.

BACKGROUND OF THE INVENTION

The absorption of a gas into a liquid is a key process step in a variety of gas-liquid contacting systems. Gas-liquid contactors, also known as gas-liquid reactors, can be classified into surface and volume reactors where the interfacial surface area is between the two phases is created at the liquid surface and within the bulk liquid, respectively. Examples of surface gas-liquid reactors are many and include rotating disks and liquid jet contactors. Rotating disk generators are disks (rotors) partially immersed in a liquid and exposed to a stream of gas. A thin film of liquid solution is formed on the rotor surface and is in contact with a co-current reagent gas stream. The disk is rotated to refresh the liquid reagent contact with the gas. In liquid jet contactors, a single or array of liquid jets are exposed to a stream of gas in co-current, counter-current, or perpendicular configurations. In a volume gas-liquid reactor, the gas phase is dispersed as small bubbles into the bulk liquid. The gas bubbles can be spherical or irregular in shape and are introduced into the liquid by gas spragers. The bubbles can be mechanically agitated to increase the mass transfer.

In many gas-liquid contacting systems the rate of gas transport to the liquid phase is controlled by the liquid phase mass transfer coefficient, k, the interfacial surface area, A, and the concentration gradient, $\Delta C$, between the bulk fluid and the gas-liquid interface. A practical form for the rate of gas absorption into the liquid is then:

$$\Phi = \phi a = k_G a (p - p_i) = k_L a (C_L^* - C_L)$$

where $\Phi$ is the rate of gas absorption per unit volume of reactor (mole/cm$^3$s), $\phi$ is the average rate of absorption per unit interfacial area (mole/cm$^2$s), a is the gas liquid interfacial area per unit volume (cm$^2$/cm$^3$, or cm$^{-1}$), p and $p_i$ are the partial pressures (bar) of reagent gas in the bulk gas and at the interface, respectively, $C_L^*$ is the liquid side concentration (mole/cm$^3$) that would be in equilibrium with the existing gas phase concentration, $p_i$, and $C_L$ (mole/cm$^3$) is the average concentration of dissolved gas in the bulk liquid. $k_G$ and $k_L$ are gas side and liquid side mass transfer coefficients (cm/s), respectively.

There are many approaches to maximizing the mass transfer and specific surface area in gas contactor systems. The principal approaches include gas-sparger, wetted wall jet and spray or atomization. The choice of gas-liquid contactor is dependent on reaction conditions including gas/liquid flow, mass transfer and the nature of the chemical reaction. Tables 1 summarize various mass transfer performance features of some conventional gas-liquid reactors. To optimize the gas absorption rate, the parameters $k_L$, a and $(C_L^* - C_L)$ must be maximized. In many gas-liquid reaction systems the solubility of the $C_L^*$ is very low and control of the concentration gradient is therefore limited. Thus, the primary parameters to consider in designing an efficient gas-liquid flow reactor are mass transfer and the interfacial surface area to reactor volume ratio, which is also known as the specific surface area.

TABLE 1

Comparison of Conventional Gas-Liquid Reactor Performance

| Reactor Type | $\beta$ (%, gas-liquid volumetric flow rate ratio) | $k_G$ (mole/cm$^2$s atm) $\times 10^4$ | $k_L$ (cm$^2$/s) $\times 10^2$ | a (cm$^{-1}$) | $k_L$a (s$^{-1}$) $\times 10^2$ |
|---|---|---|---|---|---|
| Packed Column (counter-current) | 2-25 | 0.03-2 | 0.4-2 | 0.1-3.5 | 0.04-7.0 |
| Bubble Reactors | 60-98 | 0.5-2 | 1-4 | 0.5-6 | 0.54-24 |
| Spray Columns | 2-20 | 0.5-2 | 0.7-1.5 | 0.1-1 | 0.07-1.5 |
| Plate Column (Sieve Plate) | 10-95 | 0.5-6 | 1-20 | 1-2 | 1.0-40 |

There are various gas-liquid contacting reactors whose performance is dependent on interfacial contact area. For example, the chemical oxygen iodine laser (COIL) produces laser energy from a chemical fuel consisting of chlorine gas ($Cl_2$) and basic hydrogen peroxide (BHP). The product of this reaction is singlet delta oxygen, which powers the COIL. The present technology uses circular jets of liquid basic hydrogen peroxide mixed with chlorine gas to produce the singlet delta oxygen. In a typical generator, the jets are on the order of 350 microns in diameter or smaller. To generate the jets, the liquid BHP is pushed under pressure through a nozzle plate containing a high density of holes. This produces a high interfacial surface area for contacting the $Cl_2$ gas. The higher the surface area, the smaller the generator will be and the higher the yield of excited oxygen that can be delivered to the laser cavity. Smaller and more densely packed jets improve the specific surface area, but are prone to clogging and breakup. Clogging is a serious problem since the reaction between chlorine and basic hydrogen peroxide produces chlorine salts of the alkali metal hydroxide used to make the basic hydrogen peroxide. This also limits the molarity range of the basic hydrogen peroxide, which reduces singlet oxygen yield and laser power. The heaviest element of the COIL system is this chemical fuel. These problems increase the weight and decrease the efficiency of the COIL laser. Thus there exists a need for a COIL laser that has increased efficiency and lower weight than present designs.

In another example, gas-liquid contactors are also used in aerobic fermentation processes. Oxygen is one of the most important reagents in aerobic fermentation. Its solubility in aqueous solutions is low but its demand is high to sustain culture growth. Commercial fermenters (>10,000 L) use agitated bubble dispersion to generate to enhance the volumetric mass transfer coefficient $k_L$a. The agitation helps move dissolved oxygen through the bulk fluid, breaks up bubble coalescence, and reduces the boundary layer surrounding the bubbles. The interfacial area in these systems is increased by increasing the number of bubbles in the reactor and reducing the size of the bubble diameter. However, oxygen mass transfer to the microorganism is still constrained by the relatively small interfacial surface area of the bubble and the short bubble residence times. Current sparger systems (bubble dispersion) show a relatively small volumetric mass transfer coefficient $k_L a$ (~0.2/s) and new approach for generating maximum interfacial surface area is desired to overcome these mass transfer limitations.

SUMMARY OF INVENTION

This invention relates to a gas-liquid contacting system that uses the enhanced specific surface area of a flat jet to improve the performance of gas-liquid flow reactors. The present invention uses a rigid nozzle plate containing a plurality of orifices that generate very thin flat jets. The flat jet orifice has in one configuration a V-shaped chamber attached to the source of the liquid reagent. The flat jet orifice may have a pair of opposing planar walls attached to a vertex of the V-shaped chamber. The flat jet nozzle may have a conical nozzle attached to an opposite end of the opposing planar walls as the V-shaped chamber. In another configuration, the jet orifice may have a circular orifice attached to the liquid source chamber. The flat jet nozzle may have a V-shaped groove intersecting the circular orifice to create an oval shaped orifice. The flat jet orifice may be oriented perpendicularly, opposed or parallel to the inlet source of chlorine. A smallest passage of the flat jet nozzles may be larger than 600 microns. The nozzle may produce a liquid flat jet that has a width that is at least ten times its thickness. The flat jets are may be made as thin as 10 microns and be separated by only 1 millimeter to generate high packing jet densities ($\beta$=0.01) and large specific surface areas, a=20 cm$^{-1}$. This is a 5-10× significant improvement over the specific surface area values listed in Table 1. The thin jet allows more of the liquid to be exposed to the gas flow generating a higher yield of reaction product per unit liquid mass flow than conventional contactors.

One embodiment of this invention is to provide a gas-liquid contactor that generates a plurality of thin flat jet streams, that are closely spaced, that are uniformly spaced, that have high specific surface area, that have uniform jet velocity, that are aerodynamically shaped to minimize gas flow disruption of the liquid jets, orifices that are free from salt obstruction and clogging and that are operated within co-flow, counter-flow and parallel flow gas process streams.

Another embodiment of the present invention is an improved chemical oxygen iodine laser (COIL) includes an excited oxygen generating chamber with an inlet for a source of chlorine and a flat jet nozzle for a source of basic hydrogen peroxide. The nozzle has a multitude of orifices that have a minimum dimension that is greater than 600 microns in length and generate thin flat jets of high specific surface area. A photon generating chamber has a passage coupled to the excited oxygen generating chamber and an inlet for iodine. The BHP orifice may produce a flat jet of basic hydrogen peroxide that has a width that is at least ten times its thickness. The source of hydrogen peroxide may be a basic hydrogen peroxide which uses a single base or a mixture of bases. The single base may be potassium hydroxide or any of the alkali hydroxides. The nozzle may have a pair of parallel opposing plates having a second end attached to a conical nozzle. The nozzle may have a pair of V-shaped plates coupled to a first end of the pair of parallel opposing plates.

Another embodiment of the present invention is an improved chemical oxygen iodine laser (COIL) that includes an excited oxygen generating chamber with an inlet for a source of hydrogen peroxide and a flat jet nozzle for a source of alkali (Li, Na, K) and alkaline earth (Mg, Ca) hypochlorite. In this embodiment, the hydrogen peroxide is a gas. The nozzle has a multitude of orifices that have a minimum dimension that is greater than 600 microns in length and generate thin flat jets of high specific surface area. A photon generating chamber has a passage coupled to the excited oxygen generating chamber and an inlet for iodine.

Another embodiment of the present invention is an improved fermentation reactor that includes an inlet source of oxygen and a nozzle containing a multitude of orifices for generating flat jets of fermentation media.

Another embodiment of the present invention is to provide a high surface area flat jet generator for use in gas scrubbing processes wherein gases such as ammonia, carbon dioxide, acid gases, hydrogen sulfide, sulfur dioxide are separated from a gas by liquid contact.

Another embodiment of the present invention is to provide a high surface area injector device for use in gas-liquid jet combustor engines.

DETAILED DESCRIPTION OF THE DRAWINGS

Figure 1:
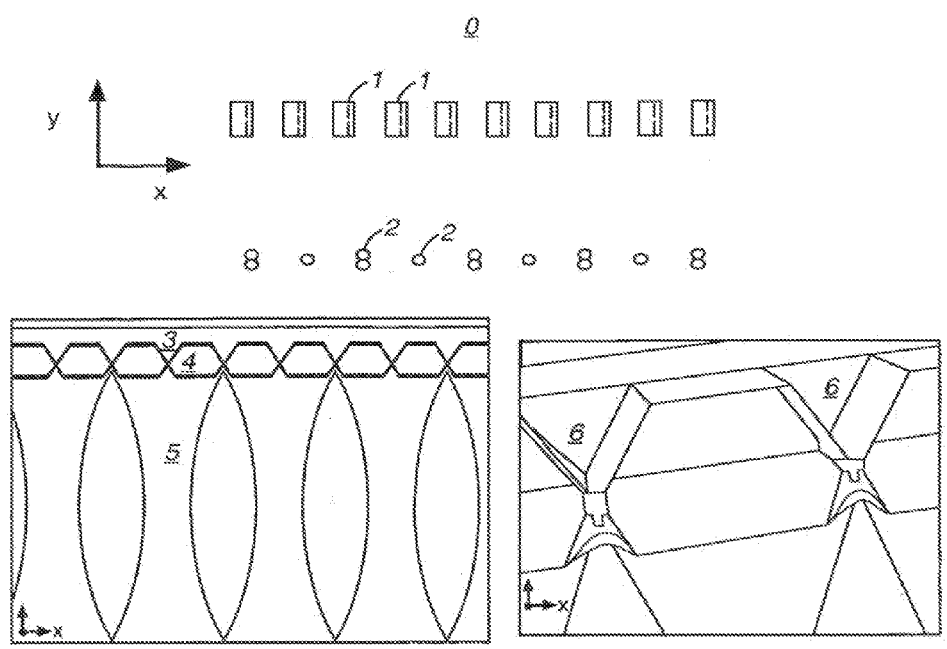
FIG. 1 is a block diagram of a system for producing a flat jet in accordance with one embodiment of the invention.

FIG. 1 is a schematic diagram of system 0 of an array of flat jet orifices for producing thin, highly dense flat jets of high surface area in accordance with one embodiment of the invention. The system 0 shows a small segment of orifice array. The orifices are staggered such that the jet orifices are separated by 2 cm in the x direction, 2 mm in the y direction and 1 mm in the diagonally. The orifice has a V-shaped entrance 1 and conical exit 2 channels for jet development. The intersection of entrance 1 and exit 2 channels creates the orifice. Cross section views of the nozzle plate showing contours of the entrance 3 and exit 4 channels.

An approximate representation of the jet exiting the orifice is shown in 5. A cross sectional close up of the entrance 6 and exit 7 channels are provided. The jet length to jet width ratio is about 10:1 with a thickness of 10-100 μm.

Figure 2:
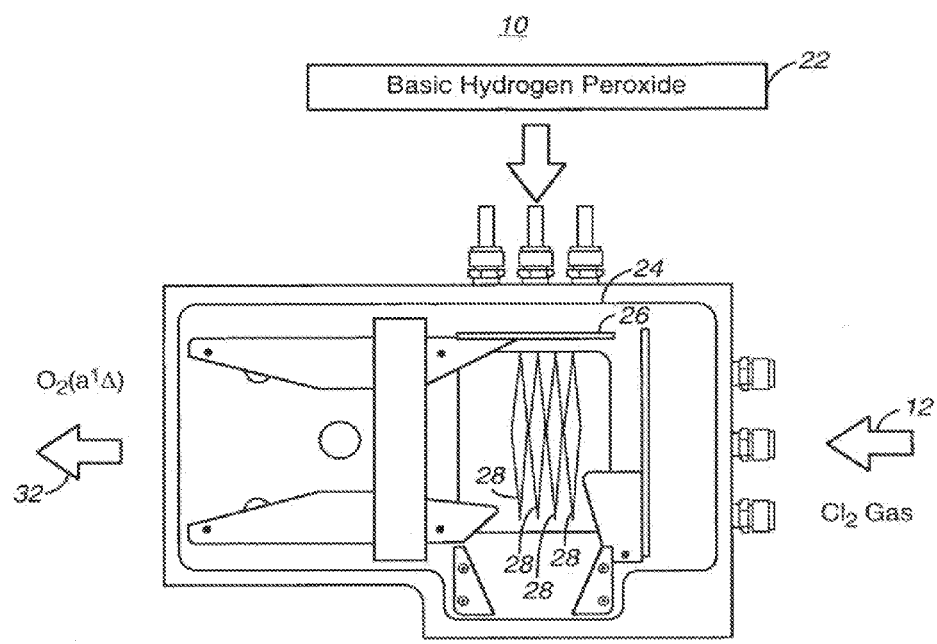
FIG. 2 is a block diagram of a system for producing excited oxygen in accordance with one embodiment of the invention.

A chemical oxygen iodine laser (COIL) that is more efficient, weighs less and is smaller than previous designs uses a flat jet technology to create a large specific area of basic hydrogen peroxide. FIG. 2 is a block diagram of a system 10 for producing excited oxygen in accordance with one embodiment of the invention. The system 10 has a source of chlorine gas (gas reactant) 12 attached to a manifold 14. The manifold 14 is has a number of holes (openings) 16 that allow the chlorine gas jets 18 to enter an excited oxygen generating chamber 20. The system 10 also has a source of basic hydrogen peroxide (liquid reactant) 22 that is formed with a single base. In one embodiment, the single base is potassium hydroxide (KOH). The basic hydrogen peroxide 22 is coupled by a piping 24 to a plurality of nozzles 26. The nozzles 26 are special flat jet nozzles that create a flat stream 28 of the liquid basic hydrogen peroxide. The flat streams 28 of hydrogen peroxide 22 interact with the chlorine gas jets 18 to produce excited oxygen 32. The system 10 may include a method collecting the basic hydrogen peroxide for reuse.

The use of a flat jet increases the specific surface area of the hydrogen peroxide 22 increasing the efficiency of the reaction with the chlorine gas 12. Tests have shown that the specific surface area of the flat jets is more than three times greater than that for standard circular jets. In addition, to increasing the surface area of the hydrogen peroxide the flat jets 26 do not require the small throats required by previous nozzles. Previous nozzles have a throat size of 150-350 microns. The flat jet nozzles 26 can use a throat that is 600 microns or larger. As a result, the nozzles 26 are unlikely to clog due to salts formed by the reaction of the hydrogen peroxide and the chlorine gas. This allows the system 10 to use a higher starting molarity of basic hydrogen peroxide solution. Molarities as high as ten moles/L may be used. Previous systems are generally limited to a starting molarity of five moles/L due to the formation of clogging salts. Most systems reuse the hydrogen peroxide, however once the molarity drops to approximately 2.5 moles/L the systems performance is seriously degraded. As a result, most previous systems are limited to a delta molarity of 2.5 moles/L (5 to 2.5) while the present invention allows a delta molarity of 7.5 moles/L (10 to 2.5). As a result, the present invention can carry one third as much basic hydrogen peroxide or have three times the capacity of previous systems.

Another embodiment of the present invention is an improved chemical oxygen iodine laser (COIL) that includes an excited oxygen generating chamber with an inlet for a source of hydrogen peroxide and a flat jet nozzle for a source of alkali (Li, Na, K) and alkaline earth (Mg, Ca) hypochlorite. In this embodiment, the hydrogen peroxide is a gas. The nozzle has a multitude of orifices that have a minimum dimension that is greater than 300 microns in length and generate thin flat jets of high specific surface area. A photon generating chamber has a passage coupled to the excited oxygen generating chamber and an inlet for iodine.

Figure 3:
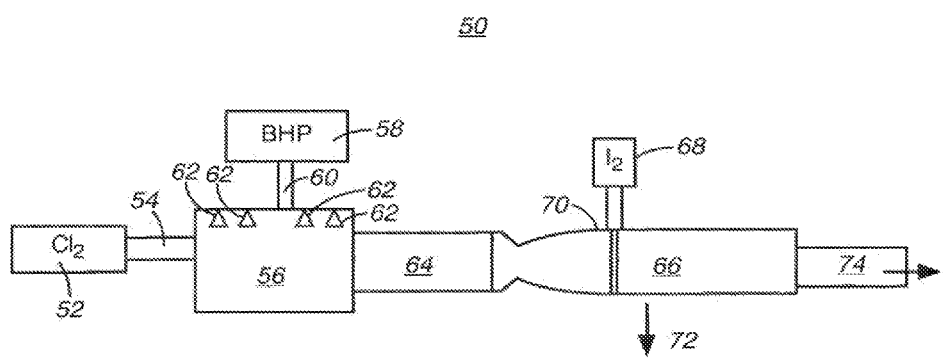
FIG. 3 is a block diagram of an improved chemical oxygen iodine laser in accordance with one embodiment of the invention.

FIG. 3 is a block diagram of an improved chemical oxygen iodine laser 50 in accordance with one embodiment of the invention. The laser 50 has a source of chlorine 52 physically coupled by a conduit or pipe 54 through a number inlets to an excited oxygen generating chamber 56. A source of basic hydrogen peroxide 58 is transported by a pipe 60 to a number of flat jet nozzles 62. The nozzles 62 allow the liquid basic hydrogen peroxide 58 to mix with the chlorine gas 52. The reaction produces excited oxygen 64, including singlet delta oxygen. The excited oxygen 64 is transported to a photon generating chamber 66. A source of iodine 68 is coupled to an inlet 70 of the photon generating chamber 66. The iodine 68 results in the excited oxygen 64 decaying and releasing photons. The photon generating chamber 66 has mirrors that allows lasing 72 with an output perpendicular to the flow of the excited oxygen. The spent oxygen 74 exits the photon generating chamber 66. The laser 50 may include a system for reclaiming the basic hydrogen peroxide for reuse. The laser 50 uses the flat jet nozzles 62 that increase the surface area of the hydrogen peroxide and allow for a higher starting molarity of basic hydrogen peroxide. As a result, the laser 50 is more efficient allowing for either a smaller size and weight than previous systems or greater laser firing capacity.

Figure 4:
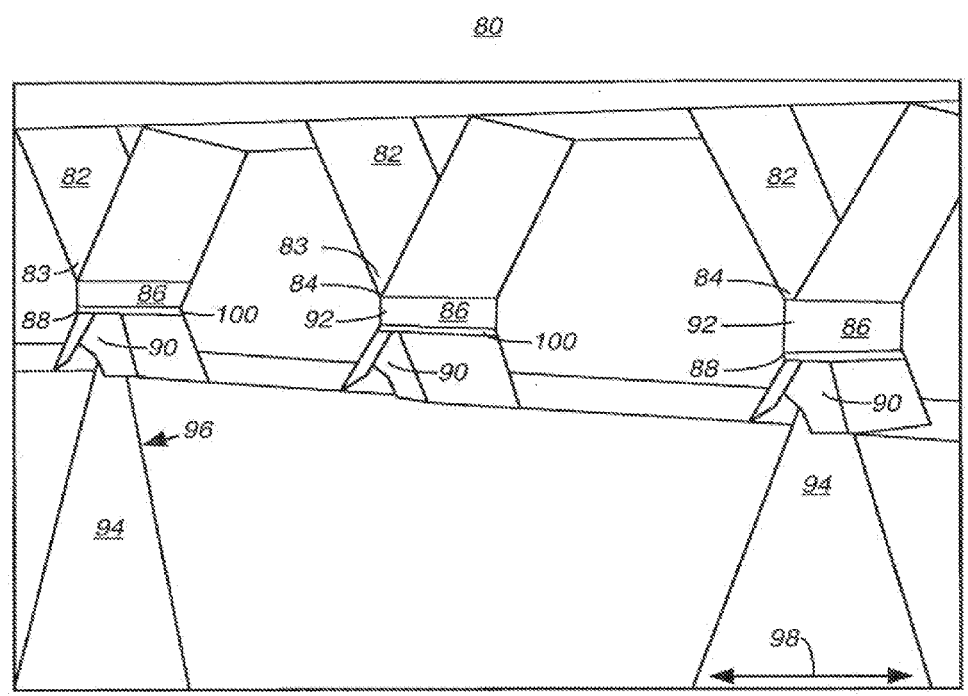
FIG. 4 is a top right perspective view of a flat jet nozzle in accordance with one embodiment of the invention.

FIG. 4 is a top right perspective view of a flat jet nozzle 80 in accordance with one embodiment of the invention. The flat jet nozzle 80 has a V-shaped chamber 82 that attaches at a vertex 83 to a first end 84 of a pair of opposing plates 86. A second end 88 of the opposing plates 86 is attached to a conical nozzle 90. The liquid basic hydrogen peroxide flows into the V-shaped chambers 82 and is forced through the passage 92 between the opposing plates 86 and out the nozzle 90 and creates a flat jet 94. Depending on nozzle area, jet flow rate and velocity, the jet thickness 96 is on the order of 5 to 100 microns and the width 98 is on the order of 1-5 centimeters. As a result, the width to thickness is significantly greater than a factor of ten. For jet velocities of approximately 10 m/s, the length of the flat jet stream may be fifteen or more centimeters. The narrowest passage 100 where the conical nozzle 90 meets the opposing planar plates 86 is greater than 600 microns. This unique nozzle 80 allows for a large surface area of liquid basic hydrogen peroxide which significantly increases the efficiency of the reaction between the basic hydrogen peroxide and the chlorine. Further, due to large jet surface area and small jet thickness this nozzle 80 produces a very large specific surface area, 10-20 $cm^{-1}$, which enables a smaller generator volume and higher yields of excited oxygen delivered to the laser cavity. In addition, the nozzle 80 does not require a small throat or passage that is likely to clog with salts that result from the reaction of the chlorine and basic hydrogen peroxide. This allows the system to have a much higher starting molarity for the basic hydrogen peroxide.

Figure 5:
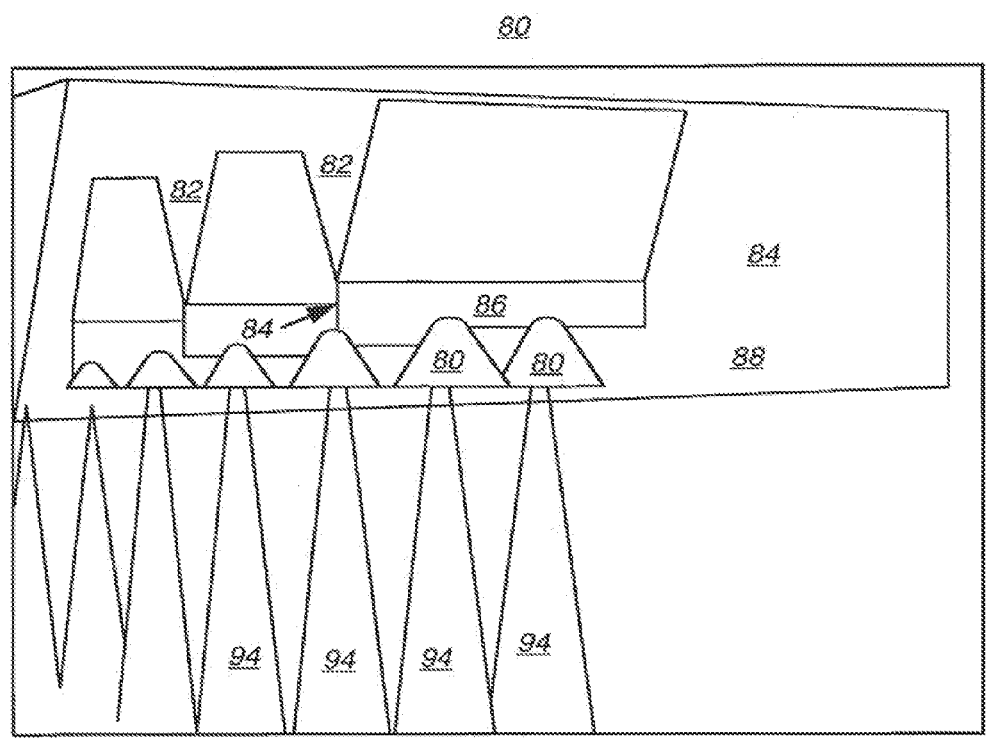
FIG. 5 is a bottom left perspective view of a flat jet nozzle in accordance with one embodiment of the invention.

FIG. 5 is a bottom left perspective view of a flat jet nozzle 80 in accordance with one embodiment of the invention. This figure shows that a number of conical nozzles 90 may be attached to the second end 88 of the opposing planar plates 86. Note that the only exit from the second end 88 of the opposing planar plates 86 is through the conical nozzles 90.

Note that while the description has focused on the application of a chemical oxygen iodine laser (COIL), the invention is applicable to any two phase reactor of contacting system. The used of this two phase reactor system significantly increases the interaction between the gas phase reactant and the liquid phase reactant. As a result, the reaction is significantly more efficient than previous two phase reactor designs allow.

Thus there has been described a chemical oxygen iodine laser (COIL) that is lighter, smaller and more efficient than similar capacity previous COIL lasers. This allows the laser to be used with smaller transport systems or increases the capacity of present transport systems.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A gas liquid contacting system, comprising:
   an input;
   a chamber in communication with the input, wherein the chamber comprises a nozzle plate comprising a plurality of orifices configured to form a plurality of liquid jets having a high packing jet density and specific surface area in a range from about 10 $cm^{-1}$ to about 20 $cm^{-1}$; and
   an output in communication with the chamber.

2. The system of claim 1, wherein one or more of the plurality of liquid jets comprises a jet length to jet width ratio of about 10:1.

3. The system of claim 1, wherein the plurality of liquid jets comprises a liquid reactant.

4. The system of claim 1, wherein one or more of the plurality of orifices includes an opening of about 600 _µm or greater.

5. The system of claim 1, wherein the system comprises a co-flow system.

6. The system of claim 1, wherein the system comprises a counter-flow system.

7. The system of claim 1, wherein the system comprises a parallel flow system.

8. The system of claim 1, wherein the system comprises a gas scrubber.

9. The system of claim 8, wherein the gas scrubber is configured for scrubbing a gas comprising one or more of carbon dioxide, acid, hydrogen sulfide, and sulfur dioxide.

10. A gas liquid contacting system, comprising:
an input;
a chamber in communication with the input, wherein the chamber comprises a nozzle plate comprising a plurality of orifices configured to form a plurality of liquid jets having a high packing jet density, a specific surface area in a range from about $10\ cm^{-1}$ to about $20\ cm^{-1}$, and one or more of the liquid jets comprises a jet length to jet width ration of about 10:1; and
an output in communication with the chamber.

11. The system of claim 10, wherein one or more of the plurality of orifices includes a passage of about 300 μm or greater.

12. The system of claim 10, wherein the system comprises a gas scrubber.

13. The system of claim 12, wherein the scrubber is configured for scrubbing a gas comprising one or more of carbon dioxide, acid, hydrogen sulfide, and sulfur dioxide.

14. The system of claim 10, wherein one or more of the plurality of offices comprises an oval shaped orifice.

15. A gas liquid contacting system, comprising:
an input;
a chamber in communication with the input, wherein the chamber comprises a nozzle plate comprising a plurality of orifices configured to form a plurality of liquid jets having a high packing jet density, a specific surface area in a range from about $10\ cm^{-1}$ to about $20\ cm^{-1}$, and one or more of the plurality of orifices comprises an oval shaped orifice; and
an output in communication with the chamber.

16. The system of claim 15, wherein a smallest passage of the oval shaped orifice is 300 μm or greater.

17. The system of claim 15, wherein the input comprises a first input configured to transport a liquid and second input configured to transport a gas.

18. The system of claim 15, wherein the output comprises a first output configured to transport a liquid and second output configured to transport a gas.

19. The system of claim 15, wherein one or more of the plurality of liquid jets comprises a jet length to jet width ratio of about 10:1.

20. The system of claim 15, wherein the gas liquid contactor system comprises a chemical oxygen iodine laser (COIL).

* * * * *

UNITED STATES PATENT AND TRADEMARK OFFICE
CERTIFICATE OF CORRECTION

PATENT NO.       : 8,814,146 B2                              Page 1 of 1
APPLICATION NO.  : 13/658818
DATED            : August 26, 2014
INVENTOR(S)      : William E. McDermott et al.

It is certified that error appears in the above-identified patent and that said Letters Patent is hereby corrected as shown below:

In the Claims

Claim 4, column 6, line 64, replace "600 _μm" with --600 μm--.
Claim 11, column 7, line 21, replace "300 _μm" with --300 μm--.
Claim 16, column 8, line 14, replace "300 _μm" with --300 μm--.

Signed and Sealed this
Nineteenth Day of May, 2015

Michelle K. Lee
*Director of the United States Patent and Trademark Office*